(No Model.) 2 Sheets—Sheet 1.

G. P. WEBSTER.
SEED POTATO CUTTER FOR PLANTERS.

No. 440,521. Patented Nov. 11, 1890.

Witnesses:
W. M. Mortimer
Chas. J. Littell

Inventor:
G. P. Webster,
By his Attorney
J. R. Littell (No Model.)
G. P. WEBSTER.
SEED POTATO CUTTER FOR PLANTERS.
No. 440,521. Patented Nov. 11, 1890.
2 Sheets—Sheet 2.
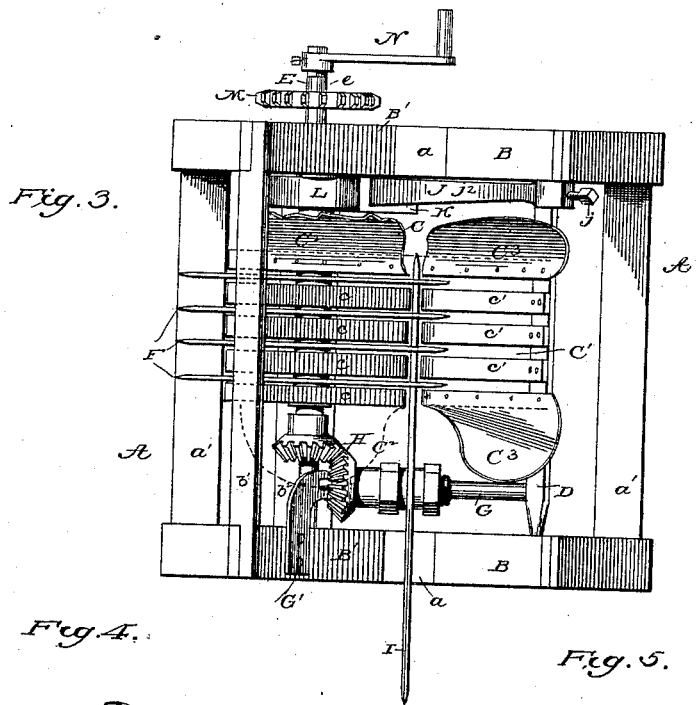
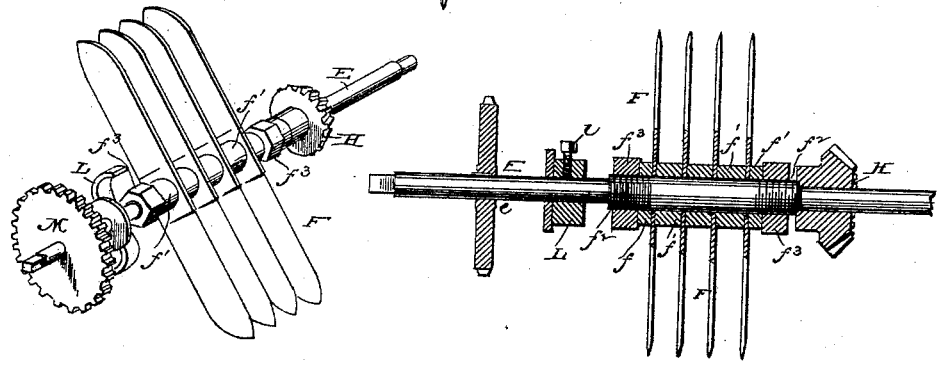
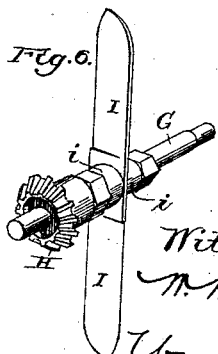
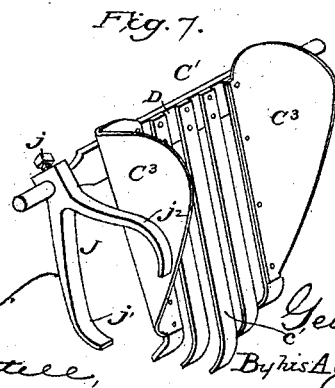

UNITED STATES PATENT OFFICE.

GEORGE P. WEBSTER, OF LIPSCOMB, TENNESSEE.

SEED-POTATO CUTTER FOR PLANTERS.

SPECIFICATION forming part of Letters Patent No. 440,521, dated November 11, 1890.

Application filed April 8, 1890. Serial No. 347,058. (No model.)

*To all whom it may concern:*

Be it known that I, GEORGE P. WEBSTER, a citizen of the United States, residing at Lipscomb, in the county of Maury and State of Tennessee, have invented certain new and useful Improvements in Seed-Potato Cutters; and I do hereby declare that the following is a full, clear, and exact description of the invention, which will enable others skilled in the art to which it appertains to make and use the same.

This invention relates to a device for cutting seed-potatoes adapted to be operated independent of or in connection with a potato-planter; and it has for its object to provide a machine of this character which will efficiently and quickly perform the purpose for which it is intended, and which will furthermore possess advantages in point of simplicity, inexpensiveness, and durability.

Figure 1:
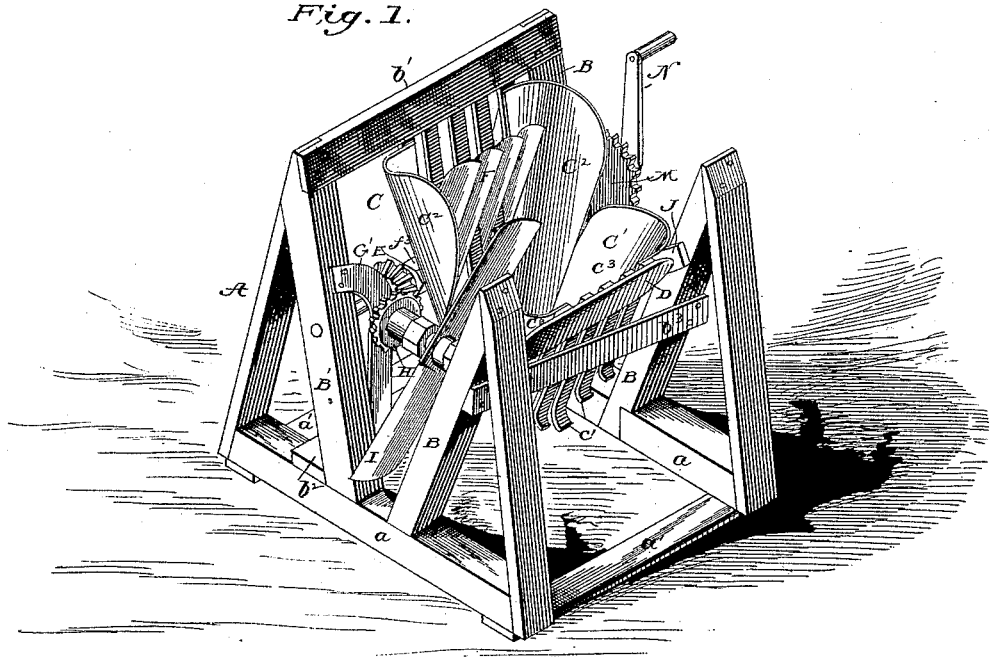
Figure 2:
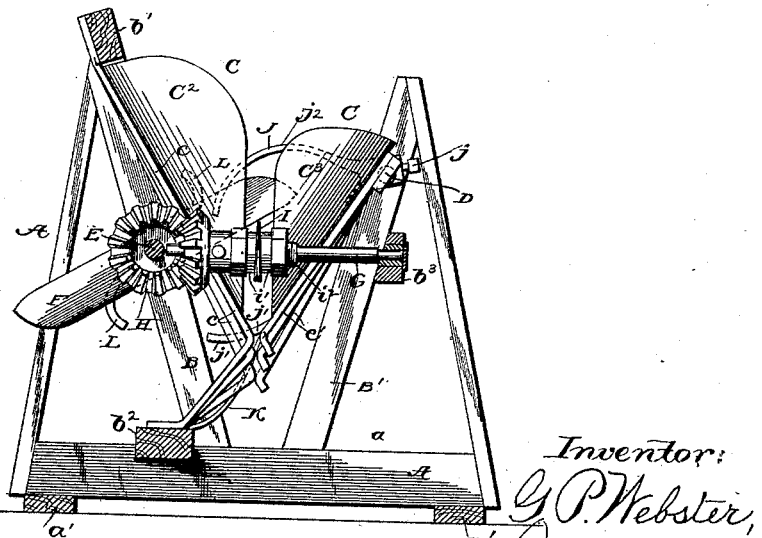

In the drawings, Figure 1 is a perspective view of a seed-potato cutter embodying my invention. Fig. 2 is a side elevation of the same, parts of the frame being broken away. Fig. 3 is a top or plan view thereof, parts of the hopper being broken away. Fig. 4 is a detail perspective view of the main shaft removed. Fig. 5 is a longitudinal sectional view thereof. Fig. 6 is a detail perspective view of the secondary shaft. Fig. 7 is a similar view of the movable section of the hopper and its shaft.

Corresponding parts in the figures are denoted by the same letters of reference.

Referring to the drawings, A designates a frame or support constructed of wood or metal, and preferably comprises two horizontally-disposed parallel main beams $a$ $a$, connected by cross-beams $a'$ $a'$. From each of the beams $a$ near the center project two upwardly-divergent uprights B B', respectively, the latter being of greater height than the former, and are connected at their upper ends by a cross-beam $b'$. The uprights B and B' are braced by bars $b$, connecting their upper ends with the ends of the beams $a$.

Upon the frame A is mounted a hopper, consisting of a stationary and a movable section C C', respectively. The former of these comprises a series of vertical ribs $c$, secured at their upper ends to the cross-beam $b'$, from whence they are inclined forwardly to the bottom of the hopper. From the latter point the ribs $c$ are bent rearwardly, and are secured at their lower ends to a cross-beam $b^2$, mounted upon the beams $a$. To the outer ribs $c$ are secured plates $C^2$ $C^2$, which are curved so as to converge toward their lower ends. The movable section of the hopper comprises a corresponding series of ribs $c'$, secured at their upper ends to a horizontal shaft D, journaled between the uprights B, the ribs $c'$ inclining rearwardly from their upper ends and meeting the ribs $c$ at the bottom of the hopper. The lower ends of the ribs $c'$ are bent forwardly below the hopper. Downwardly-convergent curved plates $C^3$ $C^3$ are secured to the outer ribs $c'$, said plates corresponding in contour to the plates $C^2$. Thus a hopper is formed by the sections C and C', having a flaring mouth and a series of vertical interstices between the ribs.

E designates a horizontally-disposed shaft journaled between the uprights B' in rear of the stationary section of the hopper and having an extended end $e$, projecting at one side of the machine. Upon this shaft are mounted a set of two or more knives F, either of a single or the double form herein shown. These knives are disposed transversely with relation to the shaft and are rigidly secured thereto, and as the shaft is rotated they are adapted to pass through the interstices between the ribs of the hopper. The knives are secured upon the shaft in the following manner: The portion of the shaft upon which the knives are mounted is of greater diameter than the ends, and the knives are provided with eyes $f$, through which this enlarged portion of the shaft passes. A collar $f'$ is interposed between each pair of knives encircling the shaft, and also at the outer side of the end knives. The ends of the enlarged portion of the shaft are provided with screw-threads $f^2$, engaged by nuts $f^3$, which are adapted to bind against the outer collars and hold the knives rigid upon the shaft and in the same plane with each other.

G designates a second shaft disposed horizontally and at right angles to the shaft E. The shaft G is journaled at one end of the machine and preferably in a cross-beam $b^3$, secured to the uprights B, and a bearing-plate G′, secured at its upper end to the adjacent upright B′ and at its lower end to the cross-beam $b^2$, motion being imparted to said shaft from the shaft E through the medium of bevel-gear H, disposed upon the respective shafts. A knife I, of either a single or the double form shown, is mounted upon the shaft G after the manner of the knives upon the shaft E, collars $i$ $i$ being disposed at either side thereof and bound against the knife by nuts $i'$ $i'$, engaging screw-threads $i^2$ $i^2$, provided at the ends of an enlarged portion of the shaft. The knife I works between the sections of the hopper and alternately with relation to the knives F.

To effect the automatic discharge of the cut potatoes from the hopper, I have provided a double-curved arm J, rigidly secured upon the shaft D by a set-screw $j$, one section $j'$ of which projecting downwardly and rearwardly and has its lower end engaged by a curved spring K, projecting from the cross-beam $b^2$, the tension of the spring being exerted to normally retain the hopper closed. The other section $j^2$ of the double arm J projects rearwardly and horizontally in the form of an arch, and is adapted during the rotation of the shaft E to be engaged by an oppositely-curved trip L to throw the lower end of the movable section C′ of the hopper forwardly and discharge the contents of the latter. The trip L may be of a single or the double approximately-S-shape form shown to effect a single or double discharge of the hopper during one rotation of the shaft E, said trip being mounted upon the latter and secured thereto by a set-screw $l$, by the adjustment of which the hopper is caused to discharge at the desired point or points during the rotation of said shaft. As the trip strikes the arm $j^2$ the latter is forced down, opening the hopper at the bottom, and when the trip has passed said arm the latter is instantly returned to its normal position by the spring K and the hopper consequently closed.

The operation and advantages of my invention will be readily understood by those skilled in the art to which it appertains. As the potatoes are fed to the hopper, motion being imparted to the shafts D and E, the knives of the respective shafts alternately pass through the hopper, cutting the contents thereof longitudinally and transversely, and after the passage of one section of each knife through the hopper the latter is opened automatically by means of the trip mechanism and the cut potatoes discharged therefrom.

It will be obvious that my improved cutter can be readily adapted for use upon potato-planters, in which event motion is imparted to the cutter-shafts from the planter through the medium of a sprocket-chain engaging a sprocket-wheel M, rigidly mounted upon the extended end $e$ of the shaft E, or in any other suitable manner. In the case of such use of the cutter the potatoes are conveyed by suitable means to the hopper of the cutter, and after they are cut discharged into or conveyed to the planter-hopper.

When it is desired to operate the cutter by hand, a crank-handle N is mounted upon the end $e$ of the shaft E in lieu of a sprocket-wheel or other gearing.

I claim as my invention—

1. In a seed-potato cutter, the combination, with a hopper comprising a stationary and a movable section, of a shaft carrying knives passing through interstices in the hopper and trip mechanism for opening the latter after the passage of the knives, substantially as set forth.

2. In a seed-potato cutter, the combination, with a hopper comprising a stationary and a movable section, of a rotary shaft carrying knives adapted to pass through interstices in the hopper, a second shaft carrying a knife adapted to pass between the sections of the hopper, and trip mechanism for opening the hopper after the passage of the knives, substantially as set forth.

3. In a seed-potato cutter, the combination, with a hopper, of rotary knives adapted to pass through interstices therein and means for effecting the discharge of the contents of the hopper after the passage of the knives, substantially as set forth.

4. In a seed-potato cutter, the combination, with a hopper comprising a stationary and a movable section, and formed of downwardly-convergent ribs and downwardly-convergent end plates, of rotary knives working in the interstices between the ribs, a rotary knife working between the hopper-sections, and means for opening the hopper after the passage of the knives, substantially as set forth.

5. In a seed-potato cutter, the combination, with a hopper comprising a stationary section and a movable section carried by a shaft, and a spring-held arm projecting from the latter, of rotary knives working in the hopper and a rotary trip adapted to alternately engage said arm during the rotation of the knives to effect the opening of the movable hopper-section, substantially as set forth.

6. In a seed-potato cutter, the combination, with a rotary shaft provided with an enlarged portion having screw-threaded ends, of a knife or knives disposed on said enlarged portion, clamping-collars encircling the latter, and nuts for binding the knife or knives upon the shaft, substantially as set forth.

7. In a seed-potato cutter, the combination, with a hopper comprising a stationary section and a movable section carried by a shaft, and a spring-held arm projecting from the latter, of a main shaft carrying rotary knifes, a secondary shaft carrying a knife disposed at right angles to the main shaft and geared therewith, said knives working in the hopper, and a trip mounted on the main shaft and adapted to engage the spring-held arm to automatically open the movable hopper-section after the passage of the knives, substantially as set forth.

In testimony whereof I affix my signature in presence of two witnesses.

GEORGE P. WEBSTER.

Witnesses:
 LEON FRINSON,
 THOMAS L. PORTER.